No. 612,871. Patented Oct. 25, 1898.
G. SANDER & A. E. DIETER.
SCREEN.
(Application filed Feb. 28, 1898.)
(No Model.)
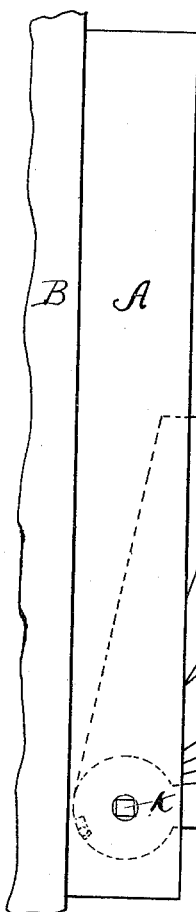
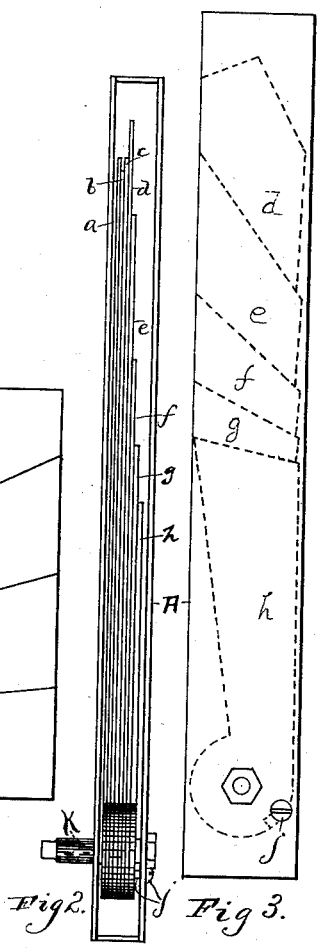
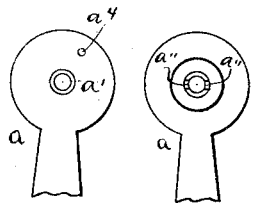
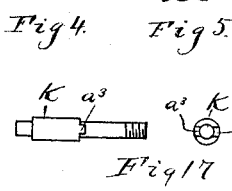
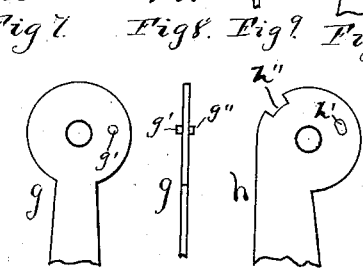
WITNESSES:
Wm. Voss.
John W. Kalbfus
G. Sander.
A. E. Dieter.
INVENTORS
By R. J. McCarty,
ATTORNEY.

UNITED STATES PATENT OFFICE.

GUSTAV SANDER AND ALBERT E. DIETER, OF DAYTON, OHIO.

SCREEN.

SPECIFICATION forming part of Letters Patent No. 612,871, dated October 25, 1898.

Application filed February 28, 1898. Serial No. 671,940. (No model.)

*To all whom it may concern:*

Be it known that we, GUSTAV SANDER and ALBERT E. DIETER, citizens of the United States, residing at Dayton, in the county of Montgomery and State of Ohio, have invented certain new and useful Improvements in Screens; and we do hereby declare that the following is a full, clear, and exact description of the invention, which will enable others skilled in the art to which it appertains to make and use the same, reference being had to the accompanying drawings, and to the letters of reference marked thereon, which form a part of this specification.

Our invention relates to improvements in screens; and it consists of a folding screen suitable for a variety of uses in restaurants, cars, offices, stores, and other places.

The object of the invention is to provide a screen that may be folded up when not in use and which has the special features and advantages hereinafter described.

Referring to the annexed drawings, Figure 1 is a side elevation showing our improved screen in a lowered position. Figs. 2 and 3 show it in an elevated or closed position. Figs. 4 to 16, inclusive, are detailed views of the inner ends of the several blades removed from the case. Fig. 17 are side and end views of the spindle. Fig. 18 is a view of the crank.

The casing A, in which the several blades may be inclosed, may be attached to a wall B or other suitable place. In restaurants where tables are placed in rows one of the screens may be placed between the tables. The casing may be provided by simply making a suitable recess in the wall to receive the blades when the latter are elevated.

K is a spindle which is journaled in the lower sides of the case and may have both of its ends made square for a key or crank K', whereby it may turn in either direction. The several blades shown in the drawings are mounted on this spindle and are lowered or elevated therewith by interlocking with each other in a manner presently described. The inner end of the blade $a$ has a rigid sleeve $a'$, through which the spindle projects, and two notches $a''$, into which shoulders $a^3$ on the sides of the spindle enter, and thereby the spindle becomes interlocked with the blade $a$. The latter blade has a pin $a^4$ on one side thereof. The remaining blades all fit over the sleeve $a'$ in the following manner: The inner end of blade $b$ has two slots $b'$ and $b''$, one of which receives the pin $a^4$ on blade $a$ and the other receives the pin $c'$ on blade $c$. The latter blade has two pins $c'$ and $c''$, one on each side in line with each other, and the latter pin $c''$ locks with one of the slots $d'$ in blade $d$, which, in addition to slot $d'$, has a second slot $d''$, which receives a pin $e'$ on one side of the blade $e$. The pin $e''$ on the other side of said blade enters the slot $f'$ in blade $f$, which has another slot $f''$, which receives pin $g'$, projecting from one side of blade $g$. $g''$ is another pin projecting from the opposite side of plate $g$ in line with $g'$ and enters slot $h'$ on blade $h$. All of the slots mentioned in the foregoing description are essentially oblong and concentric, and therefore are limited in either direction, one being supported by the pin on the next adjacent blade in positions varying (when lowered) from a horizontal to an upright and all edges overlapping. Blades $a$ and $h$ occupy positions on opposite sides of the case. The several blades so interlocked are held supported by the blade $h$, which has a square slot $h''$, which interlocks in either direction with a stop $j$. This stop lies on the inside of the case and projects into said slot $h''$. As shown, the blades are shaped and assembled to form a rectangle; but it is readily seen that the form the blades may partake of when opened may be other than that shown—such, for example, as a half-circle.

As the blades are shown in Fig. 1, they are all held supported from blade $h$, which is locked with the stop $j$. In the elevated position shown in Fig. 3 it is locked with said stop in the other direction, as the dotted lines shown in each view.

Having described our invention, we claim as new and desire to secure by Letters Patent—

1. In a folding screen, a plurality of blades provided with slots and pins as described, whereby said blades are supported one upon the other, a stop to support one of said blades and a handle to lower or raise said blades.

2. In a folding screen, the combination with a case, of a plurality of screen-blades, one of which has a sleeve upon which the others are mounted side by side, a spindle inclosed in and interlocked with said sleeve, the remainder of said blades being provided with slots and pins whereby they are adapted to interlock with each other when lowered or raised, a stop to limit the movement of one of said blades whereby the other blades are likewise limited in their movement, and means for turning the spindle to raise or lower the blades.

In testimony that we claim the foregoing as our own we hereto affix our signatures in presence of two witnesses.

GUSTAV SANDER.
ALBERT E. DIETER.

Witnesses:
A. J. FIORINI,
R. J. MCCARTY.